July 21, 1931.  F. P. FRANKFORD  1,815,557
VEHICLE CONTROL APPARATUS
Filed July 7, 1930  3 Sheets-Sheet 1
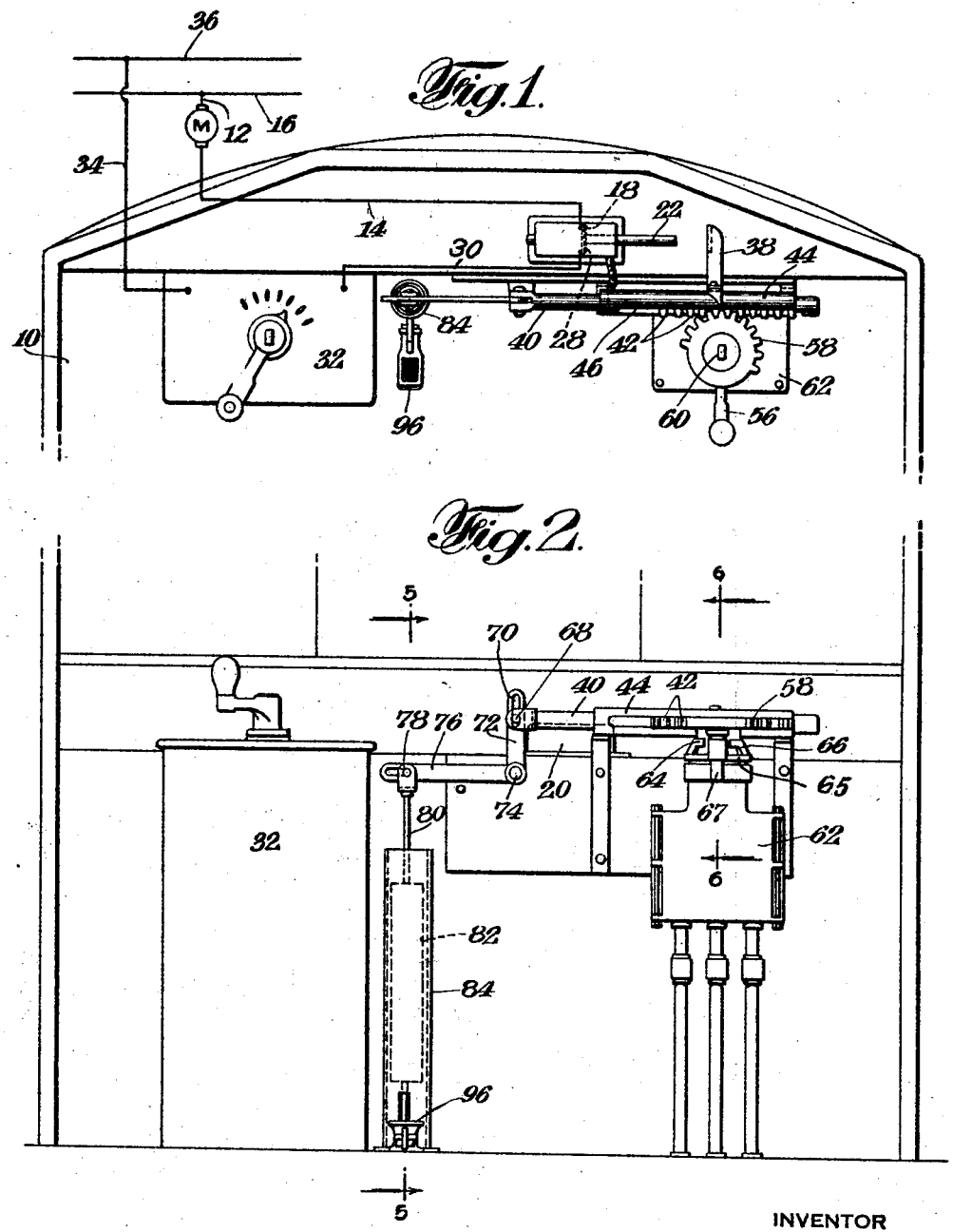
INVENTOR
Frank P. Frankford
BY
ATTORNEYS

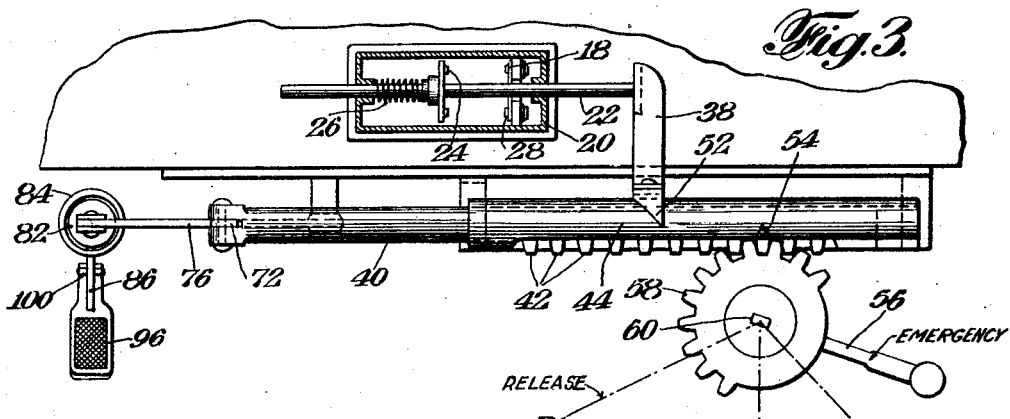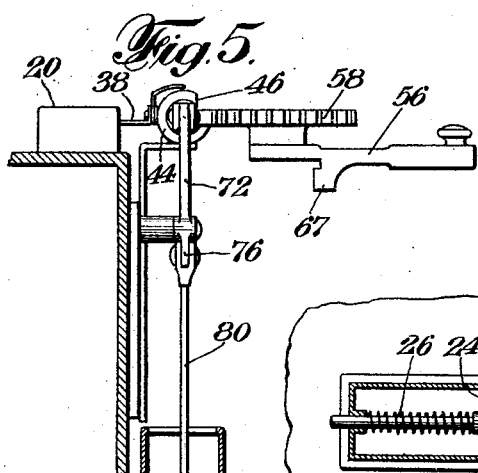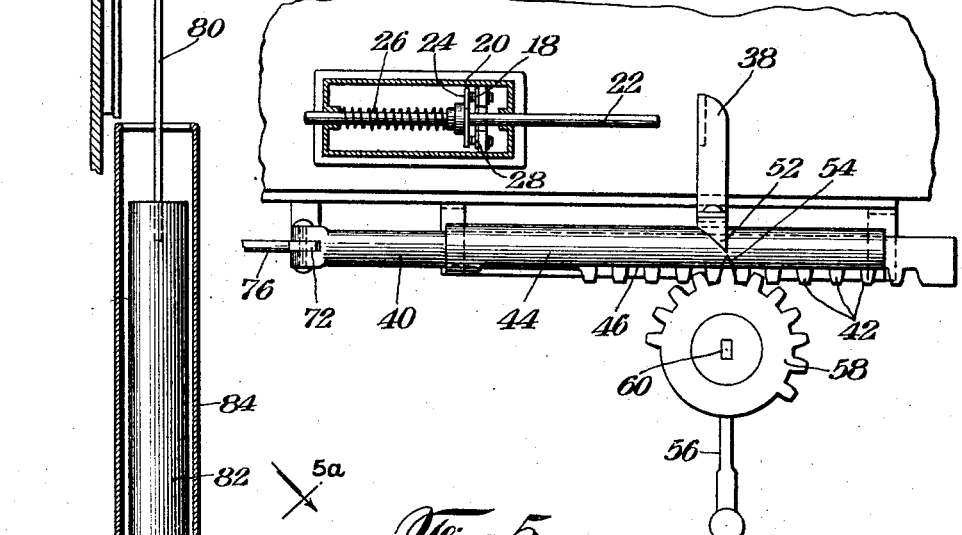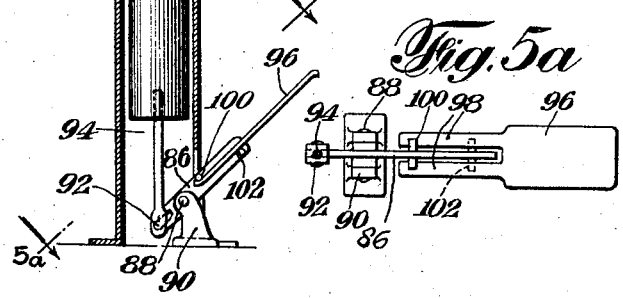

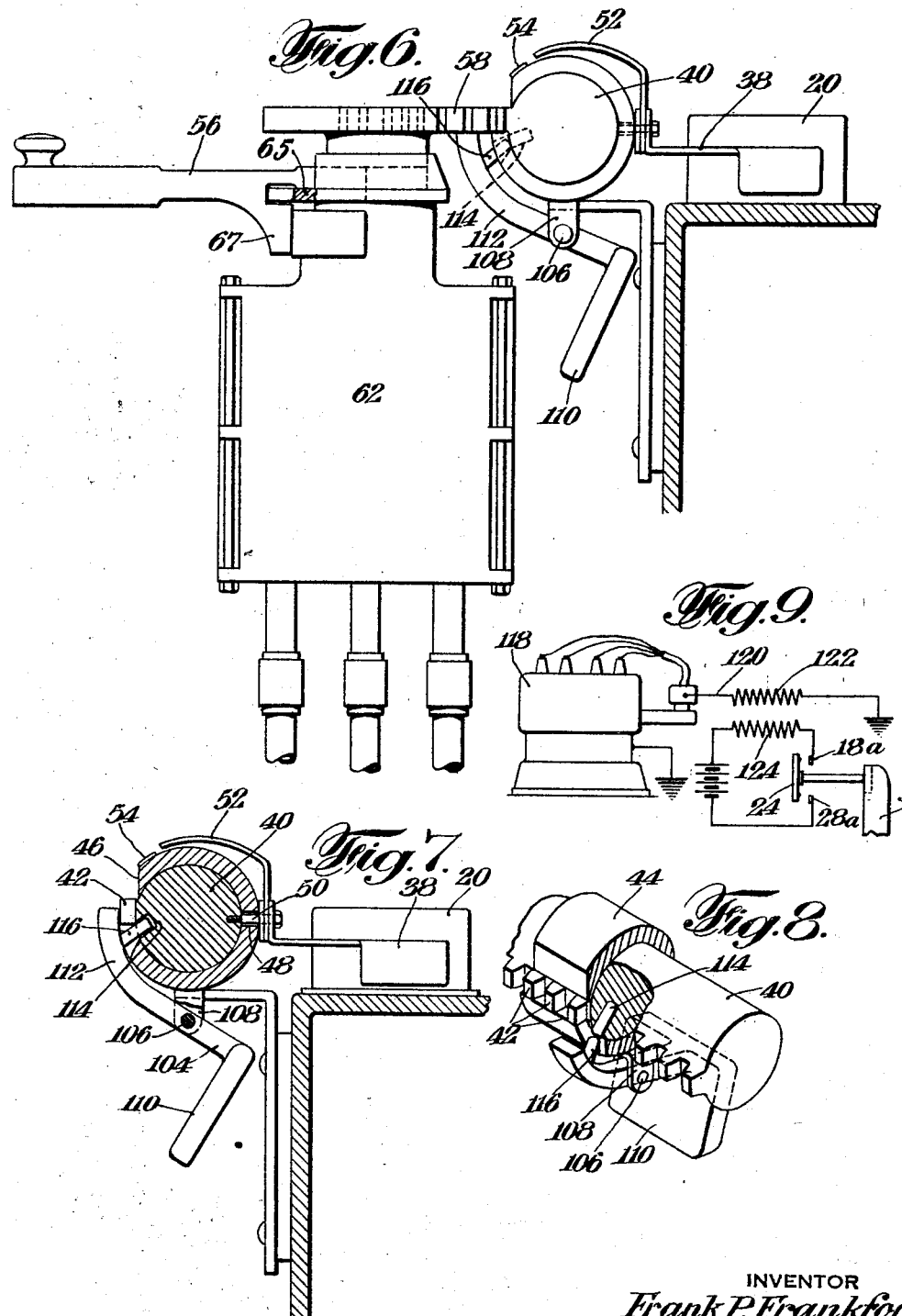

Patented July 21, 1931

1,815,557

UNITED STATES PATENT OFFICE

FRANK P. FRANKFORD, OF RIDGEFIELD PARK, NEW JERSEY

VEHICLE CONTROL APPARATUS

Application filed July 7, 1930. Serial No. 465,988.

This invention relates to a combined air brake and motor control apparatus adapted for use on motor vehicles such as street cars, subway trains and other electrically propelled vehicles and also for either electric or gas propelled motor buses and the like.

The invention contemplates the use of an air brake valve operating handle capable of actuating a member which is adapted to interrupt the operation of the motor drive for the vehicle to which the apparatus is applied.

In the embodiment of the invention illustrated, I have incorporated a so-called dead man control which includes means adapted to automatically move the brake valve control handle to braking position and also interrupt the operation of the vehicle motor in the event the motorman becomes disabled, dies, or fails to manually hold the brake handle in one of its several predetermined positions.

Upon failure of the operator to keep the vehicle under manual control, automatic means are provided which cause an application of the brakes and an interruption of normal current supply to the drive motor of the vehicle.

The invention will be fully apparent from the following specification when read in connection with the accompanying drawings and the features of novelty will be defined with particularity in the appended claim.

In the drawings:—

Fig. 1 is a plan view of the front end of an electrically operated vehicle embodying the invention, the driving motor for the vehicle being diagrammatically shown;

Fig. 2 is an elevation of parts shown in Fig. 1;

Fig. 3 is an enlarged view of certain of the control mechanism shown in Fig. 1, parts being shown in section in the interest of clearness. This figure illustrates the position of parts of the control apparatus when the air brake handle is in position to make an emergency application of the brakes;

Fig. 4 is a view similar to Fig. 3 showing the position of the parts when the air brake handle is in neutral or normal running position;

Fig. 5 is a vertical section on line 5—5 of Fig. 2;

Fig. 5ª is a detail section on line 5ª—5ª of Fig. 5;

Fig. 6 is an enlarged section on line 6—6 of Fig. 2;

Fig. 7 is a detail view of certain parts shown in Fig. 6 illustrating a locking member in locking position;

Fig. 8 is a view in perspective illustrating details of parts shown in Figs. 6 and 7;

Fig. 9 is a diagrammatic view illustrating the application of the invention to a motor bus driven by a gasoline engine.

Referring in detail to the drawings, 10 represents the front end of a street car which is adapted to be driven by a motor M connected by means of wires 12 and 14 with the supply wire 16 and the switch terminal 18, respectively. The terminal 18 is fixed within a casing 20 of a switch which includes a slidably guided rod 22 carrying a switch contact member 24. A spring 26 normally tends to press contact member 24 into engagement with switch contact 18 and another contact 28 spaced therefrom. The contact 28 is connected by a wire 30 to a hand operated controller 32 which is in turn connected by wire 34 with a current supply wire 36. As thus arranged, it will be apparent that when the contact member 24 engages the contacts 18 and 28 a circuit may be completed through the motor M and the controller 32. When, however, the contact member 24 is moved to the left, for example, from the position of Fig. 4 to that shown in Fig. 3, the supply of current to the motor will be discontinued and power will therefore be cut off. The rod 22 which carries the contact member 24 is operatively associated with a striker 38 secured to a slidably mounted member 40. This member as shown is substantially circular in cross section and is provided with a number of rack teeth 42. The member 40 is guided within a tubular supporting housing 44 which is cut away at 46 to permit the rack teeth to project outwardly therefrom. The tubular housing is also slotted at 48 to permit the passage therethrough of a stud 50 which secures the striker member 38 to the member 40. The stud 50 also clamps in place a pointer 52 which is arranged to be aligned with an index mark 54 when the parts are in neutral position.

A brake operating handle 56 having a gear sector or toothed portion 58 secured thereto, is removably secured to the operating stem 60 of an engineer's air brake valve 62 of known construction. This valve includes an interior rotary member not shown having many ports capable of making air connections which will give either a service or an emergency application of the air brakes in known manner. The valve is also adapted to be moved to position to release the brakes after they have once been applied.

The air brake valve is formed with stop lugs 64 and 66 as shown in Fig. 2 and a flange 65 slotted to permit a projection 67 formed on the air brake handle to pass the flange when the handle is in the neutral postion shown in Figs. 1 and 4. When the handle is swung to either side of the central position shown in Figs. 1 and 4, the lug 67 rides under the flange 65 and thereby prevents removal of the handle.

At one end, the member 40 carries a pin 68 which engages a slot 70 in an arm 72 of the bell crank lever pivoted at 74. An arm 76 of this lever is connected by pin and slot connection 78 with a rod 80 secured to a weight 82 guided in a tubular housing 84. A treadle 86 is pivoted at 88 in a bracket 90 and is connected by pin and slot connection 92 to a rod 94 secured to the lower end of the weight 82. Detachably secured to the treadle 86 is a foot pedal 96 which is slotted so as to form arms 98—98 which straddle the treadle 86 and engage the pins 100 and 102 secured to the treadle.

As thus arranged, it is apparent that the rack bar or operating member 40 can be reciprocated within the housing 44 either by depressing the pedal 96 or by turning the valve handle 56 which is detachably secured to the air brake valve.

The weight 82 normally tends to move the rod 40 to the left or to the position illustrated in Fig. 3. In this position, the air brake handle will set the valve to emergency application position. At the same time, in this position of the parts, the circuit will be broken across the contacts 18 and 28 due to the striker 38 pushing the rod 22 to the left against the action of the spring 26. Thus it will be clear that if the motorman becomes disabled or dies the weight 82 will automatically apply the brakes and interrupt the current supply at the motor end.

The foot treadle arrangement is provided so as to enable the operator to actuate the brake valve either by means of hand or foot. When the brake valve operating handle is moved to the full line position of Fig. 3, an emergency application of the brakes will be made. When it is moved to the position indicated by the dotted line S, a service application will be made. In both of these positions, the circuit will be broken across the contacts 18 and 28. When the handle is moved to the central position marked N in Fig. 3 and shown in full lines in Figs. 1 and 4, the valve will be in neutral position and the circuit will be closed across the contacts 18 and 28. This is the normal operating position at which time the speed of the vehicle is controlled by a manipulation of the usual controller 32.

After either a service or an emergency application of the brakes, it is necessary to move the handle to the dotted position indicated at R in Fig. 3 so as to release the brakes. Movement to this position has no effect on the switch contact member 24.

It is customary in control apparatus for street cars and various other electrically operated cars for the motorman to control the car from either end. It being customary to provide a duplicate control apparatus at each end of the car such as shown in Fig. 1. However, when the motorman leaves one end of the car, he takes with him the air brake operating handle and engages it with the air brake valve at the operating end of the car. It is therefore important to provide locking means to prevent unauthorized or inadvertent movement of the member 40 after the brake operating handle has been removed.

For preventing the movement of the member 40 when the brake operating handle is removed from the brake valve, I provide a locking dog 104 pivoted at 106 to a bracket 108. This dog is provided with a weight 110 which normally tends to press the upper end 112 thereof toward the member 40. The member 40 is provided with a notch 114 adapted to receive a locking projection 116 carried by the dog, when the member 40 occupies the neutral position illustrated in Figs. 2 and 4. Thus, it will be clear that when the valve operating handle 56 has been moved to neutral position the member 40 will have its notch 114 aligned with the projection 116. Therefore, when the valve handle is lifted, the projection will enter the notch and thus prevent movement of the member 40 by means of the weight 82.

In the embodiment of the invention above described, when the air brake handle moves to braking position, the current supply to the motor for propelling the vehicle is automatically interrupted. It is to be understood, however, that the invention is also applicable to self-propelled vehicles such as motor buses and the like which are driven by gasoline motors. Fig. 9 diagrammatically shows the application of the invention to a vehicle adapted to be driven by a gasoline motor 118. In such an arrangement, any conventional form of ignition system as shown at 120 may be employed including a secondary coil 122 and a primary coil 124. The circuit of the ignition system may include contacts 18ᵃ and 28ᵃ, the circuit across which is adapted to be normally made by contact member 24 and broken when the striker 38 carried by the aforesaid operating member 40 is moved in a direction to apply the air brakes to the vehicle.

Various modifications may be made by those skilled in the art without departing from the invention as defined in the appended claim.

What I claim is:

A combined air brake and motor control apparatus for motor driven vehicles comprising an air brake valve having a toothed operating handle removably engaged therewith, a slidable rack bar coacting with the latter, means normally tending to move said rack bar and handle to braking position, a motor, a switch coacting with said rack bar adapted to interrupt the supply of current thereto when the brake operating handle and rack bar is moved to braking position and means preventing closing movement of said switch when the operating handle is removed from said air brake valve.

In witness whereof, I have hereunto signed my name.

FRANK P. FRANKFORD.